Aug. 13, 1940.  A. W. SHEPHERD  2,211,440
FLOAT OPERATED SWITCHING DEVICE
Filed March 28, 1939  2 Sheets-Sheet 2
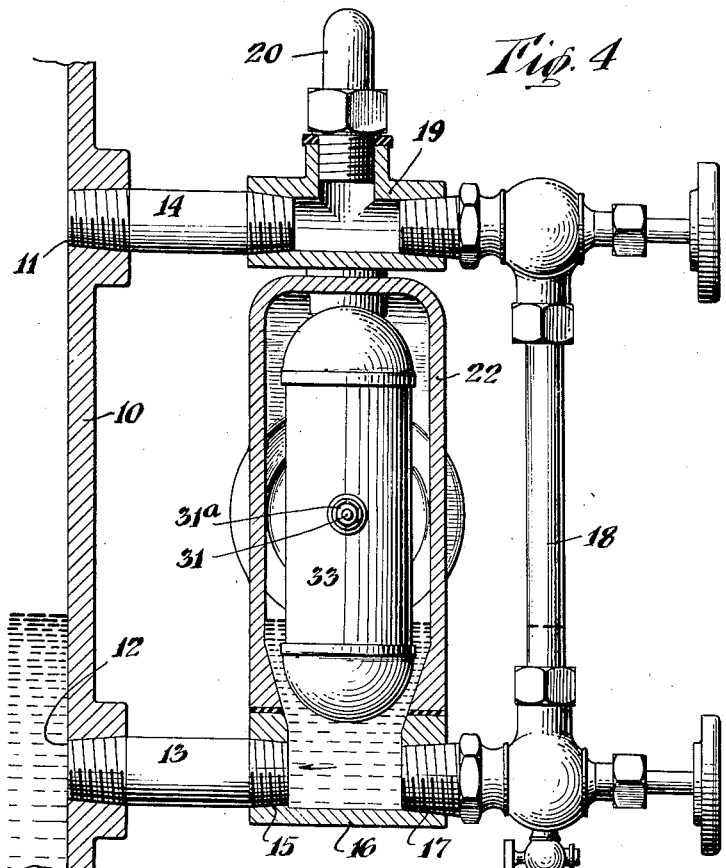
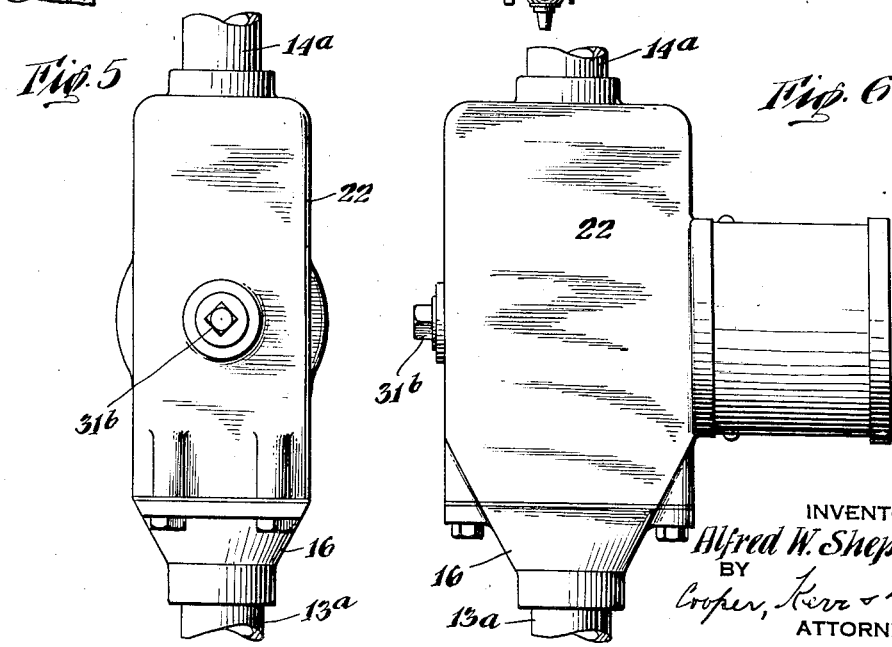
INVENTOR
Alfred W. Shepherd
BY
Cooper, Kerr & Dunham
ATTORNEYS Patented Aug. 13, 1940

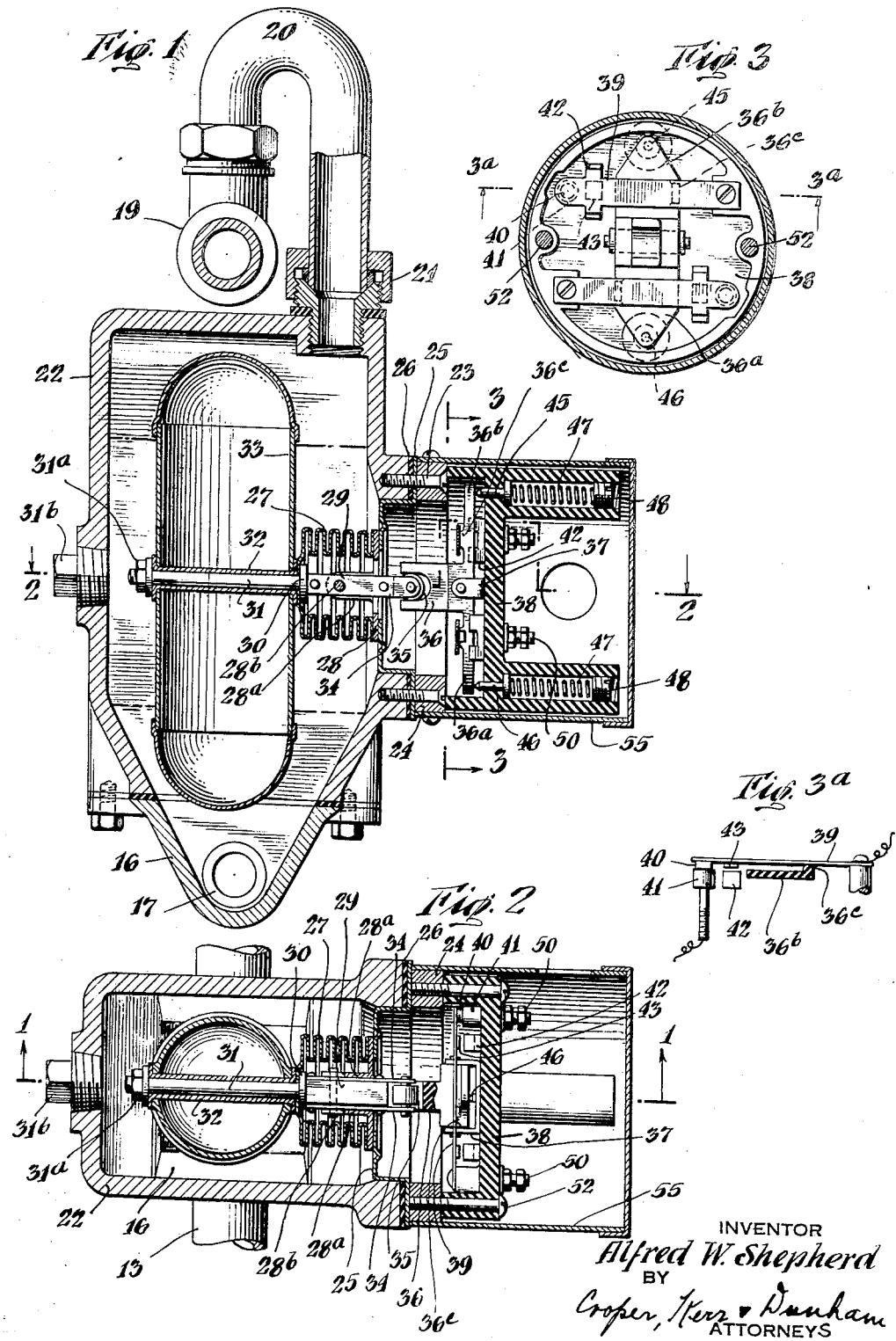

2,211,440

UNITED STATES PATENT OFFICE 2,211,440

FLOAT OPERATED SWITCHING DEVICE

Alfred W. Shepherd, Maplewood, N. J.

Application March 28, 1939, Serial No. 264,566

11 Claims. (Cl. 200—84)

This invention relates to an improved float operated switching device.

With domestic oil burner fired steam boiler installations, it is the general practice to provide a safety control which in general comprises a normally closed switch adapted to be opened to cut off the oil burner when the water level in the water level in the boiler falls below a predetermined level. A further control is also provided in the form of a switch which is normally closed and adapted to be opened when the water level rises to a predetermined high point. For such controls it is customary to provide float actuated switches. Such float operated switches, while usually reliable in operation frequently fail to act if sediment accumulations impede proper operation of the float. While sediment drain plugs are frequently provided on such devices, users neglect to use them with the result that the accumulated sediment in time impedes proper float operation.

It is one of the objects of the present invention to provide a float operated switch of such construction with the parts disposed in such a relation that sediment will be swept back to the boiler and prevented from accumulating under or upon the float and other movable parts. These objects are attained by a novel relation and disposition of the float and novel configuration and disposition of the float chamber.

A further object of the present invention resides in the provision of a float switch adapted for ready connection to boilers already in use and more particularly, to a construction adapted for disposition between the gauge glass assembly and the gauge glass openings of the boiler whereby installation is not only simplified, but reliability of subsequent operation enhanced.

A further object of the present invention resides in the provision of a float operated switch wherein a common float operates one switch for a low water condition, another switch for a high water condition and wherein independent adjusting means are provided for each of the switches so that either switch may be adjusted independently with the adjustment of one switch, not influencing the action of the other switch.

In the drawings:

Figure 1 is a vertical transverse sectional view of the device, the section being taken substantially on line 1—1 of Fig. 2;

Fig. 2 is a horizontal sectional view, the section being taken substantially on line 2—2 of Fig. 1;

Fig. 3 is a detail sectional view of the switching devices, the section being taken on line 3—3 of Fig. 1;

Fig. 3a is a detail view of one of the switch contact devices, the section being taken on line 3a—3a of Fig. 3;

Fig. 4 shows the device installed on a boiler with certain parts sectionalized to show interior construction; and Figs. 5 and 6 show end and side views of a modified embodiment.

Referring first to Fig. 4, 10 is a boiler with the customary tapped openings 11 and 12, which are provided to receive a gauge glass assembly. When my device is to be installed the gauge glass assembly is removed from these tapped openings and replaced with two short pipe nipples 13 and 14. Nipple 13 at its outer end is threaded into a tapped opening 15 in a sump bottom cap 16 (see also Fig. 1). Another tapped opening 17 is provided in the sump bottom cap to receive the lower connection of the gauge glass assembly 18. Nipple 14 at its outer end connects with a T 19 which affords a threaded connection in line with the nipple 14 to receive the top connection of the gauge glass assembly. From the top of this T 19 a curved pipe 20 (see Fig. 1) affords a connection through a packing gland 21 with the interior of the float chamber 22. The float chamber has a sloping bottom aligned with the sloping bottom of the sump cap. These sloping bottom portions guide any sediment which may settle out of the water in the float chamber to a point in the bottom cap in alignment with the nipple 13 and in alignment with the lower gauge glass connection.

When the device is installed and in use steam will condense in the U pipe 20 and the condensate will be delivered back into the interior of the float chamber. This condensate will fall on the bellows which will be later described and will wash off any sediment which may tend to collect thereon. There will also be condensation of the steam in the upper part of the gauge glass and this condensate will flow into the sump cap and clear out any sediment collecting therein, carrying such sediment back to the boiler through the nipple 13.

One side of the float chamber (see Fig. 1) is provided with a diaphragm receiving opening. Screws 23 passing through a ring-shaped piece 24 secures an annular diaphragm member 25 in position and a tight seal is provided by a gasket 26. The annular diaphragm member 25 is in turn sealed to a flexible sealing bellows 27. Also secured to the diaphragm member 25 and sealed to the bellows is a member 28 having a pair of bracket arms 28a (see also Fig. 2) which extend up within the sealing bellows and provide a bracket support for a pivot 28b. Pivotally mounted on this pivot is a lever member 29 which lever member has a flanged portion 30 adapted to be clamped in a sealing relation against the end of the bellows 27. Beyond the flange 30 there is a rod 31 which is adapted to pass through a pipe 32, which pipe passes through the sealed hollow float 33. The pipe 32 at its ends is preferably flanged over and sealed to the float. A suitable lock nut and washer 31a secures the float in position on the rod 31. Access to the nut is afforded through an opening in the float chamber which is subsequently closed up by a removable plug 31b. When the parts are to be assembled, the sump cap 16 is removed. The hollow float is then passed up through the open bottom of the float chamber. The rod 31 is then passed through the pipe, the nut 31a is placed in position and tightened up and thereafter the float chamber is closed by re-applying the sump cap bottom and introducing the plug 31b.

By the foregoing construction dead water pockets in the device are eliminated and a construction will be provided in which it is impossible for sediment accumulations to build up in the float chamber and impede proper operation of the float.

*Float construction and mounting*

33 designates a suitable sealed hollow float. At its center, this float is provided with a pipe connection 32 which is flanged over and sealed to the sides of the float. The float is mounted and secured to a rod 31 which passes through the pipe 32. Rod 31 has a flange 30 which is adapted to solder against the inside of a bellows 26.

Fast to a port in the float chamber is an annular member 25. This annular member at its smaller portion is sealed to a flexible sealing bellows 26. This flexible bellows 26 has within it a member 27, which affords a double arm bracket adapted to carry a pivot 28. Pivotally mounted on this pivot is a lever 29 which lever has a flanged portion 30 sealed to the flexible bellows. Beyond this flange 30 there is a rod 31 which can pass through the pipe 32. A suitable nut and lock washer 31a secures the float in position upon the rod.

It will be appreciated that the condensate which collects in the bottom of the float chamber when the device is in use establishes liquid flow across the bottom of the sump and back to the boiler through the nipple 13 and such flow which predominates toward the boiler will be sufficient to keep sediment from accumulating in the bottom of the sump to an extent which would impede float operation. Such liquid flow constantly scavenges and removes sediment from the bottom of the float chamber and carries it back to the boiler. Lever 29 carries a pair of arms 34 (see Fig. 2). These arms at their right hand end pivotally support a roller 35. Roller 35 engages a recess in a rocking member 36 (see Fig. 1.) This rocking member is preferably made of suitable insulating material. The rocking member is pivotally supported on a clip 37, which clip is secured to a base member 38 made of suitable insulating material. The rocking member 36 has two extensions best shown in Fig. 3 and designated 36a and 36b. Extension 36b is provided with a ridge 36c which underlies a blade spring 39. The blade spring 39 is mounted at one end of the base 38. On its opposite end the blade spring carries a contact element 40 adapted to make contact with a contact element 41 which is carried on the base 38. Also carried on the base 38 is a permanent magnet 42 which attracts an armature 43 carried by the blade spring. This magnet and armature provide for quick snap action of the contacts both on make and break. By providing the ridge 36c in the location shown, good snap action is secured. It will be understood that if the member 36 is rocked so that part 36b comes up in Fig. 3 that pressure will be applied upon the blade spring. When this pressure overcomes the magnetic attraction between the armature and the magnet the contacts will snap to open position.

This blade contact arrangement is duplicated with another set of blades, contacts, magnets, etc. at the opposite sides of the device. These need not be described as their action is identical. It is sufficient to state that the other arm 36a actuates this set of contacts.

In its normal position as indicated in Fig. 1 of the drawings, rocking member 36 has in abutting relation therewith an upper plunger 45 and a lower plunger 46. Each of these plungers is pressed to the left by a spring 47. The tension of each of these individual springs may be varied by adjustment means which preferably assume the form of screw plugs 48 which are threaded in the respective spring receiving openings provided in the base 38. The upper spring 47 impedes and resists clockwise movement of the rocking member 36 and also resists lowering of the float or rocking of the float assembly in an anti-clockwise direction about pivot 28b. The lower spring 47 in a similar manner resists anti-clockwise movement of the rocking member 36 and also resists upward movement of the float from its normal position depicted in Fig. 1 of the drawings. Such upward movement, of course, involves a clockwise rocking of the float assembly about its pivot 28b.

Accordingly, adjustment of the upper plug 48 will modify the force which impedes lowering of the float upon lowering of the water level in the float chamber, while adjustment of the lower plug 48 will vary the force which impedes raising of the float upon raising of the water level in the float chamber. When the water level falls in the float chamber, the float will fall slightly and the bellows 27 flex slightly, after the resistance of the upper spring 47 has been overcome. The roller 35 will rise and rock the rocking member 36 in a clockwise direction as viewed in Fig. 1. The rocking motion will ultimately cause opening of the lower blade contact. When the water level rises in the float chamber to a certain point, the lower blade contacts will be restored.

Further rise of the water level will first overcome the impeding resistance of the lower spring 47, whereupon the bellows will flex slightly in reverse direction, the roller 35 will be lowered and the member 36 will rock in an anti-clockwise direction to cause opening of the upper blade contacts.

Adjustment of the individual plugs 48 may be effected independently to control the operation of the device in such a way as to afford opening of the lower contacts at a predetermined, but adjustable, water level and to afford opening of the upper contacts at another predetermined, but adjustable, water level.

With the construction disclosed, the float is restrained and restricted against excessive movement either up or down and accordingly, there is only a slight flexing of the bellows 27 which is conducive to an increased life and elimination of breakage of the bellows.

Suitable terminals are provided which are generally designated 50 (Figs. 1 and 2). It will be understood there are four such terminals, two for each blade contact.

The base 38 is removably mounted on the ring 24 by means of suitable screws 52. Ring 24 in turn is secured to the float chamber housing by suitable screws 23 (Fig. 1). A cover for the switching parts of the device may be provided of any suitable form such as that indicated at 55.

Figs. 5 and 6 show modifications wherein the inlet to the float chamber is provided by a vertical pipe 13a which enters directly in the bottom of the sump and wherein the upper connection is afforded by a pipe 14a, which opens directly into the top of the float chamber 22.

Summarizing the operation of the device. With the float in intermediate position, both sets of contacts will be closed. When the float falls to a determined point one set of contacts will open. When the float rises from the intermediate position to a determined higher point, the other set of contacts will open. The point at which each set of contacts will open may be adjusted by adjusting the tension of the related spring. The spring adjustments are independent and the adjustment of one spring controlling the point at which one set of contacts open with the falling float is not influenced by the other adjustment which controls the point at which the other set of contacts is open with the rising float.

What I claim is:

1. In a float operated switch with a float and switching means controlled thereby, the combination with said float of a self-cleaning float chamber for use in connection with a boiler having a gauge glass, said float chamber having aligned horizontally extending connections at its lowest portion for connecting the lower portion of the gauge glass with the boiler to cause liquid passing between the gauge glass and boiler to pass across and scavenge the lowermost portion of the float chamber whereby sediment is prevented from accumulating in the float chamber which would prevent free operation of the float and the means controlled thereby.

2. In a float operated switch with a float and switching means controlled thereby, the combination with said float of a self-cleaning float chamber for use in connection with a boiler having a gauge glass, said float chamber having a sediment receiving sump and a pair of aligned connections at the opposite sides of its lowermost portion for connecting the lower portion of the gauge glass with one side of the sump and to connect the opposite side of the sump to the boiler to cause liquid passing between the gauge glass and boiler to pass across and scavenge the lowermost portion of the sump whereby sediment is prevented from accumulating in the float chamber and prevented from impeding free operation of the float and the means controlled thereby.

3. In a float operated switch with a float chamber, a float therein and switching means controlled thereby, the combination with said float of a rocking member rocked by the float, a pair of switching devices operated by said rocking member, both of said switching devices being closed with the rocking member in intermediate normal position, means including spring means and adjusting means therefor to adjust the resistance of the rocking member to float movement in one direction to vary the water level point at which one switch will open and means including spring means and adjusting means therefor to adjust the resistance of the rocking member to float movement in the opposite direction to vary the water level at which the other switch will open, said last two mentioned spring means and adjusting means being each independent of the other for the purpose described both of said spring means being disposed to maintain yielding pressure upon the rocking member and to maintain the float in a predetermined intermediate position until variation of the water level up or down overcomes the resistance of one spring member or the other.

4. In a float operated switch with a float chamber, a float therein, and a switch operated by connection to said float, the combination with said float and float chamber of a flexible sealing bellows for housing the connection from the float to the switch and fluid delivery means directed towards said bellows to direct condensate upon said bellows to clean off sediment therefrom.

5. In a float actuated switch with a float and switching mechanism operated thereby, the combination with said float of a float chamber having sloping bottom portions extending to a sump in which sediment may be received, a side outlet opening at the lowermost portion of said float chamber leading from the side of said sump to a boiler and fluid delivery means directed across the lowermost portion of said chamber and towards said outlet opening to establish automatic liquid flow across the bottom of the sump to and through said side outlet opening to the boiler with liquid movement predominating toward the boiler for the purpose described.

6. In a float operated switch with a pair of switches, common operating means for both switches, and including in combination, a common float for operating said operating means and for effecting operation of both switches, spring means to restrain movement of the operating means so that both switches are maintained closed and the float maintained against displacement for all variations of water level in a predetermined adjustable range, said restraining means providing for the opening of one switch under control of the float upon its displacement in one direction when the water level rises above the high point of the predetermined range and provided for the opening of the other switch under control of the float upon its displacement in the opposite direction when the water level falls below the low point of the predetermined range, and adjusting means for said restraining means for varying the range.

7. The invention according to claim 6 wherein a pair of independent adjusting means are provided one for one switch and the other for the other switch, each being independent of the other to provide independent adjustment for the high and low points of the range.

8. In a float controlled switching mechanism with a float and switching means for interrupting one circuit upon high level float conditions and switching means for interrupting another circuit upon low level float conditions, the combination wherein there is a single common float and operating connection for controlling both of the foregoing switching means and further including adjustable spring means for impeding the upward float movement of the common float which interrupts one circuit upon high level displacement of said common float with a second adjustable spring means for impeding float movement of said common float in the opposite direction for the interrupting of the other circuit upon a low level displacement of said common float, both of said switching means being closed in intermediate positions of said float and means for operatively connecting both of the impeding means to the float to maintain the latter in an intermediate position and against displacement for all variations of water level between high and low level conditions.

9. The invention according to claim 8, wherein means are provided for independently adjusting the separate impeding means.

10. The float controlled switching mechanism according to claim 8, wherein a common operating means is provided for operating both the low level switching means and the high level switching means from the common float, depending upon the direction of movement and position of said float and wherein a pair of adjusting means are provided, one adjusting means changing the impedance to float movement in one direction and the other adjusting means changing the impedance to float movement in the opposite direction, each adjusting means being independent of the other.

11. In a float operated switch with a float chamber, a pair of switches and a float common thereto disposed in said chamber, operating means common to said switches operated by and from said float; the combination with said float and float chamber of a flexible sealing bellows for housing operating means between the float and the switches; a pair of resilient yielding means to restrain displacement of the float and flexing of the bellows and actuation of either of said switches for all variations of water level in a predetermined adjustable range; one of said yielding means yielding upon raising of water level beyond said range to afford limited displacement of the float, limited flexing of the bellows and actuation of one of said switches; the other of said yielding means yielding upon the lowering the water level below said range to allow limited displacement of the float, limited flexing of the bellows in the opposite direction and actuation of the other of said switches; and independent adjusting means to individually adjust the tension of each yielding means whereby an independent adjustment may be secured for the high and low water points of the range.

ALFRED W. SHEPHERD.